US009741188B2

(12) United States Patent
Seagraves et al.

(10) Patent No.: US 9,741,188 B2
(45) Date of Patent: Aug. 22, 2017

(54) MOBILE DEVICE CASE (71) Applicant: Ford Global Technologies, LLC, Dearborn, MI (US)

(72) Inventors: Jamel Seagraves, Mountain View, CA (US); Chih-Wei Tang, Mountain View, CA (US); Sudipto Aich, Palo Alto, CA (US); Darioush Aghai-yazdi, San Carlos, CA (US); Yonathan Redda, Sunnyvale, CA (US); Casey Bryan Feldman, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/800,451

(22) Filed: Jul. 15, 2015

(65) Prior Publication Data
US 2017/0018132 A1    Jan. 19, 2017

(51) Int. Cl.
| G05D 1/00 | (2006.01) |
| G05D 3/00 | (2006.01) |
| G06F 7/00 | (2006.01) |
| G07C 9/00 | (2006.01) |
| G05B 1/01 | (2006.01) |
| H04M 1/18 | (2006.01) |
| H04M 1/725 | (2006.01) |

(52) U.S. Cl.
CPC ........... *G07C 9/00309* (2013.01); *G05B 1/01* (2013.01); *H04M 1/185* (2013.01); *H04M 1/72533* (2013.01); *H04M 1/72541* (2013.01); *H04M 2250/22* (2013.01)

(58) Field of Classification Search
None
See application file for complete search history.

(56) References Cited

U.S. PATENT DOCUMENTS

RE43,891 E * 1/2013 Golden ................. B60R 25/018
340/426.11
RE43,990 E * 2/2013 Golden ................. B60R 25/018
340/426.11
(Continued)

FOREIGN PATENT DOCUMENTS

| FR | 3010365 A1 | 3/2015 |
| GB | 2519452 A | 4/2015 |

(Continued)

OTHER PUBLICATIONS

Chris Wood, Modular Nexpaq case can add battery life, laser pointers and much more to your phone, Mobile Technology, Apr. 29, 2015.

*Primary Examiner* — Nicholas Kiswanto
*Assistant Examiner* — Kenny A Tavares
(74) *Attorney, Agent, or Firm* — David R. Stevens; Stevens Law Group (57) ABSTRACT

An example mobile device case is described. In one implementation, the mobile device case includes a housing that surrounds at least a portion of a mobile device. A capacitive touch button is disposed on the housing and associated with a vehicle function. A user activation sensor initiates monitoring of the capacitive touch button in response to a user contact. A vehicle control module senses activation of the capacitive touch button and, in response to sensing the activation, initiates the associated vehicle function.

16 Claims, 7 Drawing Sheets

(56) References Cited

U.S. PATENT DOCUMENTS

| | | | |
|---|---|---|---|
| 8,760,405 B2* | 6/2014 | Nam | G06F 1/1616 345/168 |
| 2007/0241881 A1* | 10/2007 | Golden | B60R 25/018 340/521 |
| 2010/0109838 A1* | 5/2010 | Fisher | G07C 9/00563 340/5.72 |
| 2013/0141212 A1* | 6/2013 | Pickering | G05B 1/01 340/5.61 |
| 2014/0309866 A1* | 10/2014 | Ricci | B60Q 1/00 701/36 |
| 2014/0309868 A1* | 10/2014 | Ricci | B60Q 1/00 701/36 |
| 2014/0309871 A1* | 10/2014 | Ricci | B60Q 1/00 701/36 |
| 2014/0342668 A1* | 11/2014 | Kyomitsu | G07C 9/00944 455/41.2 |
| 2015/0332532 A1* | 11/2015 | Lee | G07C 9/00563 340/5.72 |
| 2016/0070527 A1* | 3/2016 | Ricci | G06F 3/165 715/716 |
| 2016/0098878 A1* | 4/2016 | Cabouli | G06F 21/32 340/5.52 |

FOREIGN PATENT DOCUMENTS

| | | | |
|---|---|---|---|
| WO | WO 2015-022615 A2 | 2/2015 | |
| WO | WO 2015-049317 A1 | 4/2015 | |

* cited by examiner

MOBILE DEVICE CASE

TECHNICAL FIELD

The present disclosure relates to a mobile device case that also controls at least one function associated with a vehicle.

BACKGROUND

Smartphones and other mobile devices are commonly carried by individuals in their pocket, purse or briefcase. Many mobile devices, especially smartphones, are carried in a case that protects the device from damage due to dropping the device or other impacts. Additionally, most drivers carry a vehicle key fob that includes one or more buttons to lock/unlock vehicle doors, open the trunk, activate an alarm, and the like. The vehicle key fob can also be carried in a pocket, purse or briefcase. Thus, many users carry both a mobile device and a vehicle key fob simultaneously.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The mobile device case discussed herein protects a mobile device and initiates various vehicle-related functions commonly performed by a vehicle key fob. Example mobile devices include smartphones, tablet computers, portable entertainment devices, gaming devices, and the like. Multiple buttons are provided on the back of the mobile device case that allow a user to perform vehicle-related functions with the mobile device case instead of a vehicle key fob. By integrating the key fob functionality into the mobile device case, the user receives the benefit of the case's protection as well as the key fob functions without requiring the user to carry a separate vehicle key fob.

Figure 1:
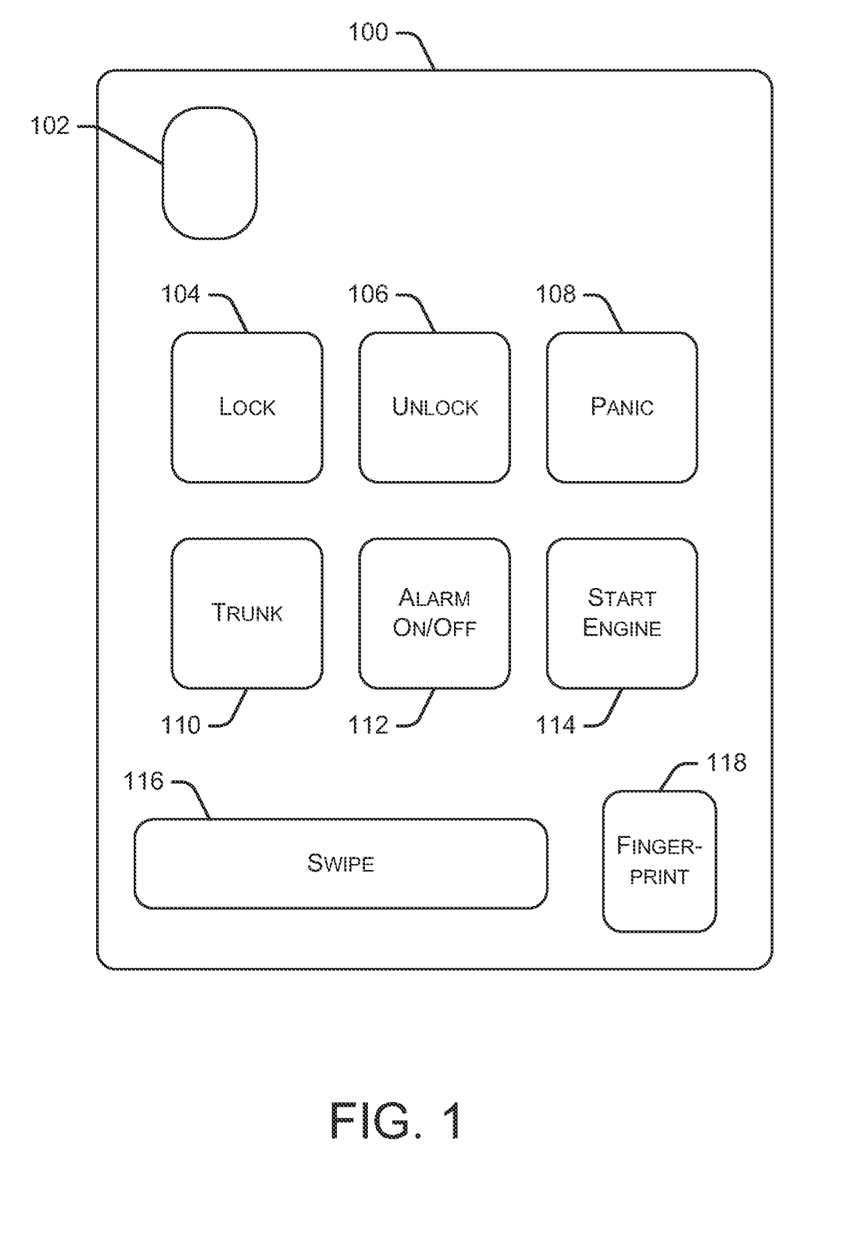
FIG. 1 depicts an embodiment of a mobile device case.

FIG. 1 depicts an embodiment of a mobile device case 100 that can have any dimensions to accommodate a specific mobile device. Mobile device case 100 forms a housing into which a mobile device is inserted. FIG. 1 illustrates the back of mobile device case 100. The front of mobile device case 100 includes an opening that allows the case to attach to the mobile device (e.g., insert the mobile device into the case) and at least partially surround the mobile device. Mobile device case 100 can be manufactured from any appropriate material. In some embodiments, mobile device case 100 is manufactured from a material that has some flexibility, which allows the case to bend and stretch as the mobile device is inserted into the case. The material should also provide protection for the mobile device in case of accidental drops or other impact.

Mobile device case 100 includes an opening 102 to allow a rear-facing camera on the mobile device to capture images. The size, location, and shape of opening 102 will vary based on the size, location, and shape of the mobile device's rear-facing camera. Mobile device cases 100 for mobile devices that do not include a rear-facing camera may omit opening 102.

Multiple buttons 104, 106, 108, 110, 112, and 114 are located on mobile device case 100 and perform various vehicle-related functions. For example, button 104 locks a vehicle's doors and button 106 unlocks the vehicle's doors. Similarly, button 108 activates a panic warning (e.g., horn or siren), button 110 opens the vehicle's trunk, button 112 turns a vehicle alarm on or off, and button 114 starts the vehicle's engine (e.g., a remote start function). Each button 104-114 may have a word (as shown in FIG. 1) indicating the function performed by the button or a graphical image representing the function. For example, lock button 104 may include a picture of a lock in addition to, or instead of, the text "Lock".

Although the example of FIG. 1 shows six particular buttons, alternate embodiments may include any number of buttons that perform any type of function. Further, buttons 104-114 can be arranged in any manner and placed anywhere on mobile device case 100. In the illustrated embodiment, buttons 104-114 all perform vehicle-related functions. In alternate embodiments, one or more of buttons 104-114 perform functions that are not related to a vehicle, such as opening a garage door or activating a light.

Generally, mobile device case 100 has a substantially planar surface. Buttons 104-114 can be recessed into the surface plane, protrude slightly from the surface plane or positioned substantially planar with the surface. In some embodiments, buttons 104-114, when pressed, activate a mechanical switch or mechanical contact that detects activation of the button. In other embodiments buttons 104-114 may be capacitive touch sensors that sense contact by, for example, a user's finger. In operation, capacitive touch sensors sense the electrical capacitance of the human body. In alternate embodiments, any type of sensor, button or switch can be used for buttons 104-114. In a particular implementation, a resistive touch sensor is used for one or more of buttons 104-114.

Mobile device case 100 includes an optional swipe area 116 and an optional fingerprint sensing area 118. Swipe area 116 is an area that senses a user swipe of their finger and fingerprint sensing area 118 senses characteristics of a user's fingerprint. These areas 116 and 118 may be labeled as "swipe area" and "fingerprint sensing area", respectively. Alternatively, areas 116 and 118 may not be labeled, but are known to a user of the mobile device case 100 through written instructions or other training. Although mobile device case 100 includes both a swipe area 116 and a fingerprint sensing area 118, alternate embodiments may only contain area 116 or area 118. Other embodiments may omit both swipe area 116 and fingerprint sensing area 118.

As discussed herein, in some embodiments, mobile device case 100 may disable buttons 104-114 until a user has swiped their finger in swipe area 116 or authenticated their fingerprint in fingerprint sensing area 118. This method of operation prevents inadvertent activation of buttons 104-114 (i.e., by ignoring activation of buttons 104-114 until the user specifically enables those buttons). Additionally, requiring authentication of a user's fingerprint provides a level of security that prevents an unauthorized user from, for example, unlocking a vehicle or remotely starting a vehicle. In other embodiments, a user can enable buttons 104-114 by entering a pre-defined passcode, sequence of button presses, and the like.

In some embodiments, when buttons 104-114 are disabled, the buttons may be hidden (e.g., not displayed to the user). For example, if the button has a symbol or text that can be illuminated, that illumination is deactivated when buttons 104-114 are disabled. This provides an indication to the user that the buttons are not currently active. After the user swipes, uses a fingerprint sensor or performs another action to enable buttons 104-114, the buttons are illuminated or otherwise displayed to the user.

Figure 2:
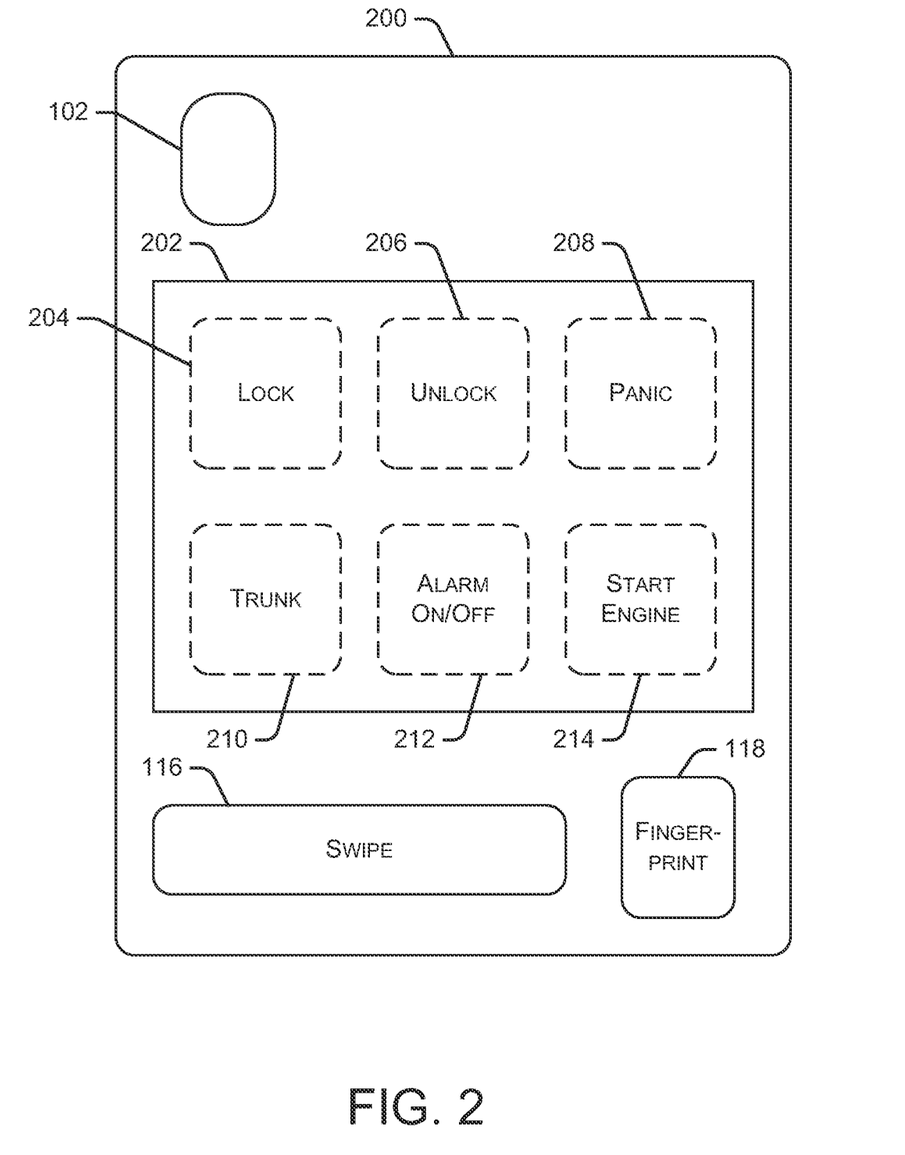
FIG. 2 depicts another embodiment of a mobile device case.

FIG. 2 depicts another embodiment of a mobile device case 200 which includes a capacitive touch screen 202. Mobile device case 200 differs from the embodiment discussed with respect to FIG. 1 by replacing buttons 104-114 with multiple button images 204, 206, 208, 210, 212, and 214 displayed on capacitive touch screen 202. As discussed above, mobile device case 200 includes an opening 102 to allow a rear-facing camera on the mobile device to capture images. Additionally, mobile device case 200 includes swipe area 116 and fingerprint sensing area 118. In some embodiments, a user swipes area 116 or places their finger on area 118 to activate touch screen 202, which then displays button images 204-214. In other embodiments, a user may cause buttons 204-214 to be displayed by swiping their finger in a particular manner on touch screen 202. For example, touch screen 202 may be dark (i.e., not displaying any images) until a user swipes their finger from the lower-left corner of the touch screen to the upper-right corner of the touch screen. When the appropriate swipe action is detected, touch screen 202 is activated and displays button images 204-214. Alternate embodiments may use any swipe pattern using any number of fingers (e.g., a two finger swipe or a three finger swipe), including multiple different swipes (e.g., a single finger swipe from left to right followed by a two finger swipe from right to left). Other embodiments may use various combinations of button presses, combinations of long and short taps, and the like for the unlocking sequence.

Although touch screen 202 displays button images associated with vehicle functions, the touch screen may also display button images that perform functions unrelated to a vehicle. Additionally, touch screen 202 may display other information in addition to, or instead of, button images such as time of day, calendar reminders, and the like.

Although mobile device case 200 includes both a swipe area 116 and a fingerprint sensing area 118, alternate embodiments may only contain area 116 or area 118. Other embodiments may omit both swipe area 116 and fingerprint sensing area 118.

In some embodiments, when button images 204-214 are disabled, the touch screen 202 may be hidden (e.g., not displayed to the user). For example, the touch screen may be deactivated or the button images 204-214 are not displayed on touch screen 202. This provides an indication to the user that the buttons are not currently active. After the user swipes, uses a fingerprint sensor or performs another action to enable button images 204-214, the button images are displayed to the user on touch screen 202.

Figure 3:
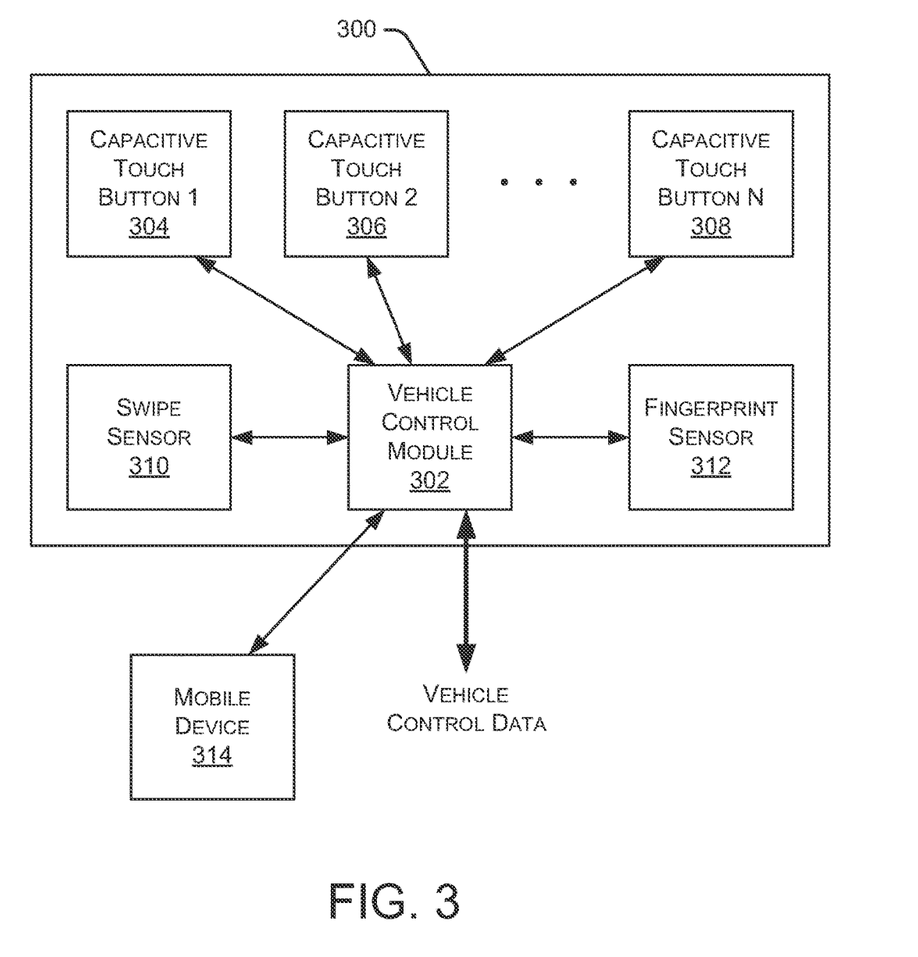
FIG. 3 is a block diagram depicting an embodiment of a mobile device case in an example operating environment.

FIG. 3 is a block diagram depicting an embodiment of a mobile device case 300 in an example operating environment. Mobile device case 300 includes multiple capacitive touch buttons 304, 306, and 308 that are coupled to a vehicle control module 302. A particular mobile device case 300 may include any number of capacitive touch buttons. Each capacitive touch button 304-308 is associated with a particular vehicle function, as discussed herein. Vehicle control module 302 receives input signals from capacitive touch buttons 304-308, such as signals indicating activation of a particular capacitive touch button. Based on the capacitive touch button activated, vehicle control module 302 generates an appropriate signal that causes a vehicle to perform the function associated with the activated button. For example, if a user presses a "door lock" button, vehicle control module 302 will generate a signal that instructs the specific vehicle to unlock one or more doors. The generated signal is then communicated to the vehicle (indicated in FIG. 3 as "Vehicle Control Data"). Additional details regarding the operation of vehicle control module 302 are discussed herein.

Mobile device case 300 also includes a swipe sensor 310 and a fingerprint sensor 312. A user may swipe sensor 310 or apply their finger to fingerprint sensor 312 to activate capacitive touch buttons 304-308. As discussed with respect to FIGS. 1 and 2, this method of operation prevents inadvertent activation of capacitive touch buttons 304-308 (i.e., by ignoring activation of capacitive touch buttons 304-308 until the user specifically enables those buttons). Additionally, requiring authentication of a user's fingerprint provides a level of security that prevents an unauthorized user from activating any of the capacitive touch buttons 304-308.

Mobile device case 300 also communicates with a mobile device 314, which may be inserted into mobile device case 300. In some embodiments, mobile deice 314 performs one or more operations that support the functioning of vehicle control module 302. For example, mobile device 314 may assist with authentication of a user fingerprint, reading a user swipe, generating a signal that instructs a vehicle perform a function, and so forth. Additionally, mobile device 314 may provide power to mobile device case 300, which can operate the components of mobile device case 300 or charge a battery contained in mobile device case 300.

Figure 4:
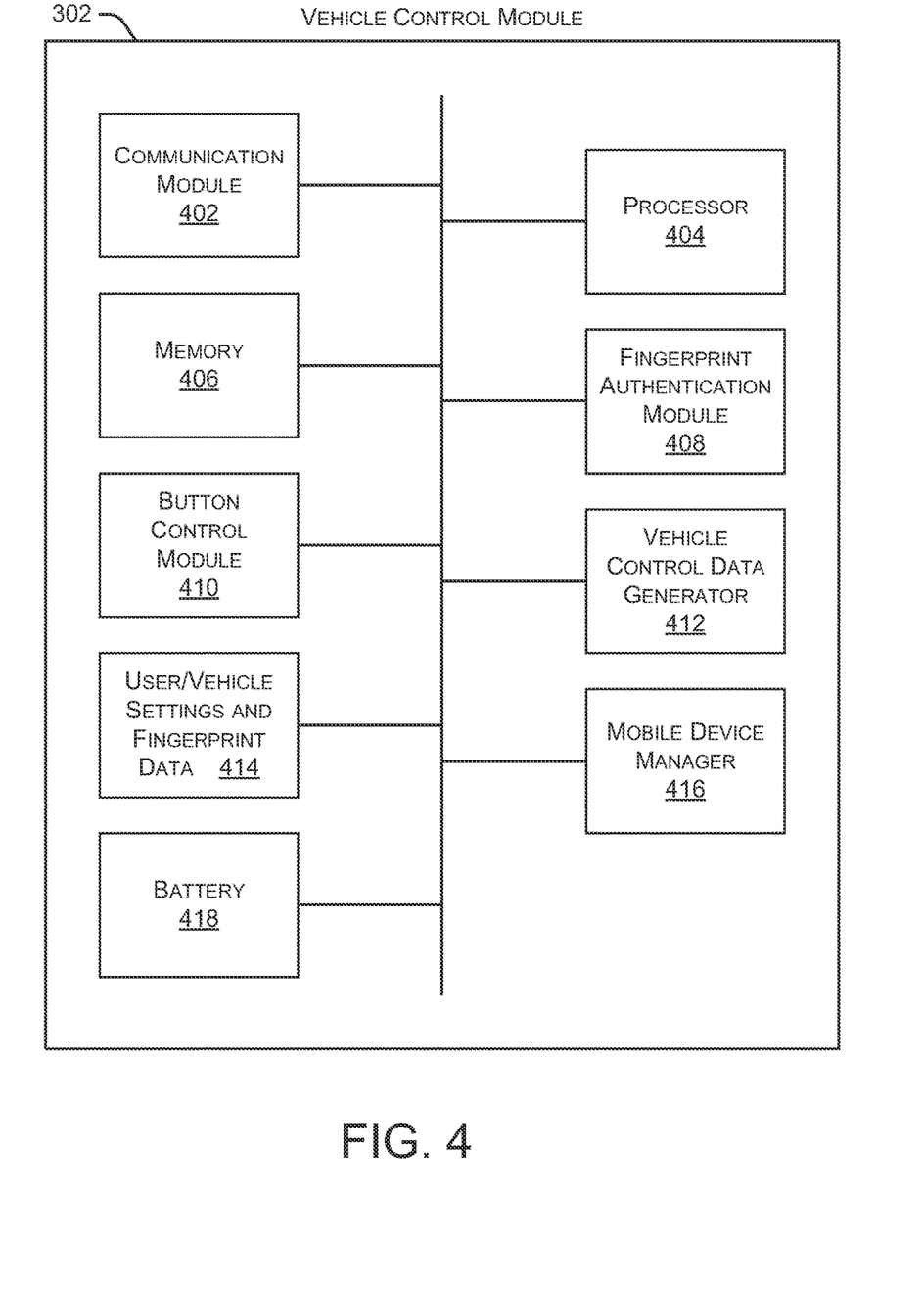
FIG. 4 is a block diagram depicting an embodiment of a vehicle control module.

FIG. 4 is a block diagram depicting an embodiment of vehicle control module 302. As shown in FIG. 4, vehicle control module 302 includes a communication module 402, a processor 404, and a memory 406. Communication module 402 allows vehicle control module 302 to communicate with other systems, such as a mobile device, a vehicle, and the like. Processor 404 executes various instructions to implement the functionality provided by vehicle control module 302. Memory 406 stores these instructions as well as other data used by processor 404 and other modules contained in vehicle control module 302.

Additionally, vehicle control module 302 includes a fingerprint authentication module 408 that authorizes fingerprint data received through, for example, fingerprint sensor 312. Fingerprint authentication module 408 may compare fingerprint data from a fingerprint sensor with previously stored fingerprint data of an authorized user. A button control module 410 controls whether buttons or a touch screen is activated and/or displayed. In some embodiments, button control module 410 turns off any light or display associated with buttons or a touch screen until a user performs an appropriate swipe, fingerprint authentication, or other activity to activate the buttons or touch screen.

Vehicle control module 302 further includes a vehicle control data generator 412 that is capable of generating signals that perform specific functions for a particular vehicle. These signals, when communicated to the particular vehicle, cause the vehicle to perform the specific functions. Each signal has a unique code that identifies the specific vehicle such that the same signal will not perform any function on other vehicles. This unique code and other data is stored as user/vehicle settings and fingerprint data 414. This data 414 allows vehicle control module 302 to operate with a specific vehicle (based on the unique code for that vehicle), authenticate a particular user (based on fingerprint data), and perform other functions based on one or more user settings.

A mobile device manager 416 in vehicle control module 302 manages communication with one or more mobile devices, such as mobile device 314 shown in FIG. 3. Mobile device manager 416 can control the communication of vehicle control signals to a mobile device, which then communicates the vehicle control signals to a particular vehicle. Additionally, mobile device manager 416 may request that a mobile device perform certain functions, such as fingerprint authentication, reading a swipe sensor, executing an application associated with the functions performed by a mobile device case, and the like.

Vehicle control module 302 also includes a battery 418 that powers the various components in vehicle control module 302 as well as buttons, a touch screen, swipe sensor, and fingerprint sensor contained in the same mobile device case. In some embodiments, battery 418 is rechargeable and may be recharged by a mobile device inserted into the mobile device case. In these embodiments, power can be supplied to the mobile device case from the mobile device's charging port. In particular implementations, the mobile device and battery 418 are configured to be charged simultaneously. In some embodiments, vehicle control module 302 does not include a battery. Instead, vehicle control module 302 receives power from a mobile device inserted into the mobile device case.

In particular embodiments, one or more of the operations performed by the components and modules shown in FIG. 4 may be performed by a mobile device inserted into the mobile device case. For example, a mobile device may authenticate fingerprints, generate vehicle control signals, communicate vehicle control signals to a particular vehicle, and the like.

In particular embodiments, an application executing on the mobile device inserted into mobile device case (e.g., case 100 or 200) allows a user to "activate" buttons (e.g., buttons 104-114 or button images 204-214). The application causes the mobile device to communicate with, for example, vehicle control module 302 and instruct the vehicle control module to activate the buttons. The application executing on the mobile device may automatically activate the buttons, or may wait for a finger swipe, fingerprint reading or entering a particular code before instructing the vehicle control module to activate the buttons.

Figure 5:
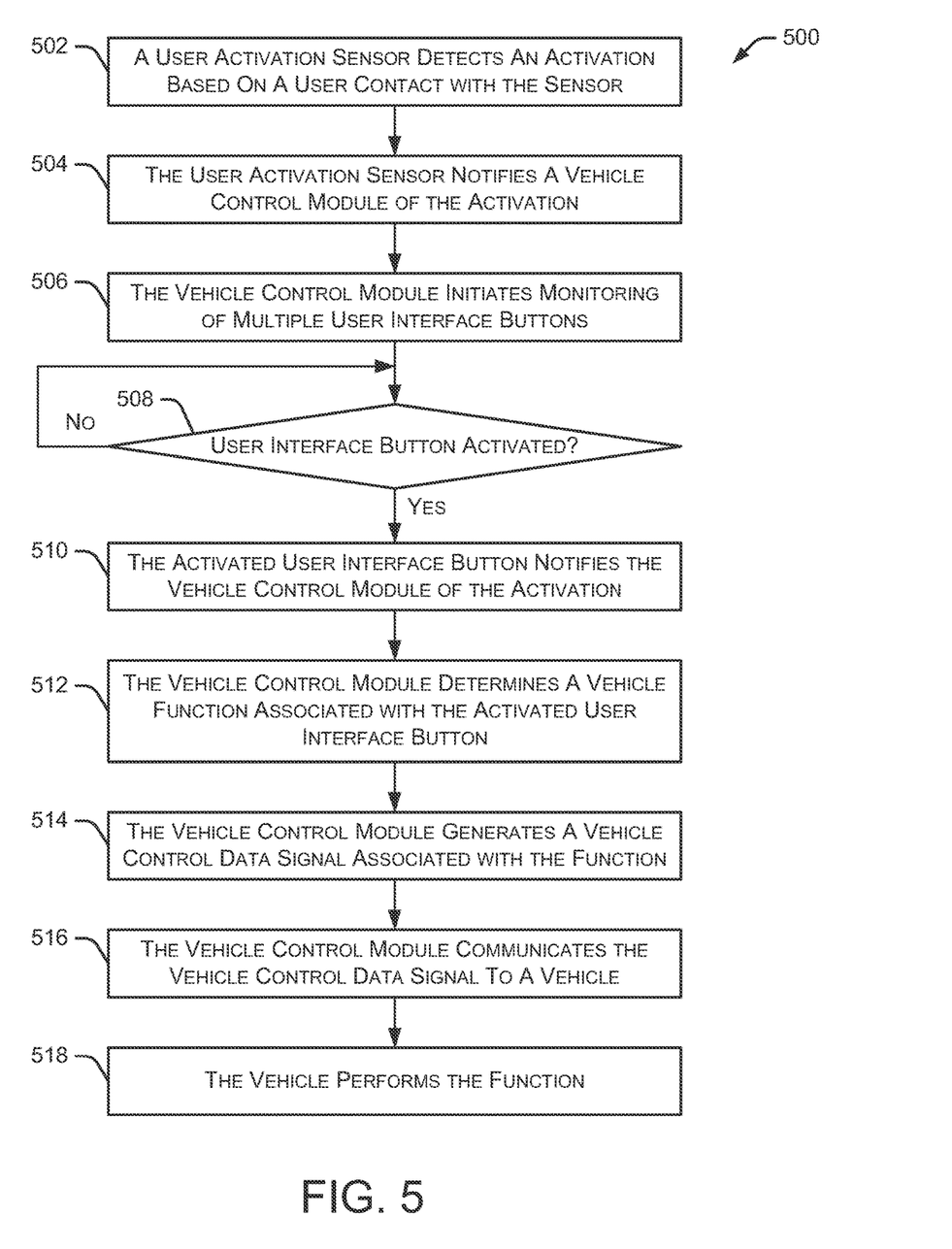
FIG. 5 is a flow diagram depicting an embodiment of a method for performing vehicle functions using buttons on a mobile device case.

FIG. 5 is a flow diagram depicting an embodiment of a method 500 for performing vehicle functions using buttons on a mobile device case. Initially, a user activation sensor detects an activation based on a user contact with the sensor at 502. As discussed herein, the user activation sensor can be a swipe sensor, a touch screen, a fingerprint sensor, a button, and the like. The user activation sensor notifies a vehicle control module of the activation at 504. The vehicle control module then initiates monitoring of multiple user interface buttons at 506. Additionally, the vehicle control module may optionally display, illuminate or otherwise indicate that the multiple user interface buttons are activated for user input.

Method 500 continues by determining whether a user has activated any of the user interface buttons at 508. If a user interface button is activated, the activated user interface button notifies the vehicle control module of the activation at 510. For example, a signal may be communicated from the activated user interface button to the vehicle control module in response to activation of the button by a user. The vehicle control module determines a vehicle function associated with the activated user interface button at 512. The vehicle control module then generates a vehicle control data signal associated with the function at 514. This vehicle control data signal contains data identifying the function to be performed and a unique code associated with the specific vehicle being controlled. The vehicle control module communicates the vehicle control data signal to the specific vehicle at 516, which causes the specific vehicle to perform the function at 518. In some embodiments, the user interface buttons remain active for a specific period of time after the vehicle control data signal is communicated to a vehicle, thereby allowing a user to activate another user interface button without having to re-activate the user interface buttons. For example, the system may wait several seconds to determine whether the user activates another user interface button. If no user interface button activation is detected within the defined waiting period (e.g., several seconds), the user interface buttons are deactivated to conserve power and prevent accidental activation of the user interface buttons. The period of time that the user interface buttons remain active can be any length of time. In particular implementations, a user of the mobile device case may define the period of time that the user interface buttons remain active.

Figure 6:
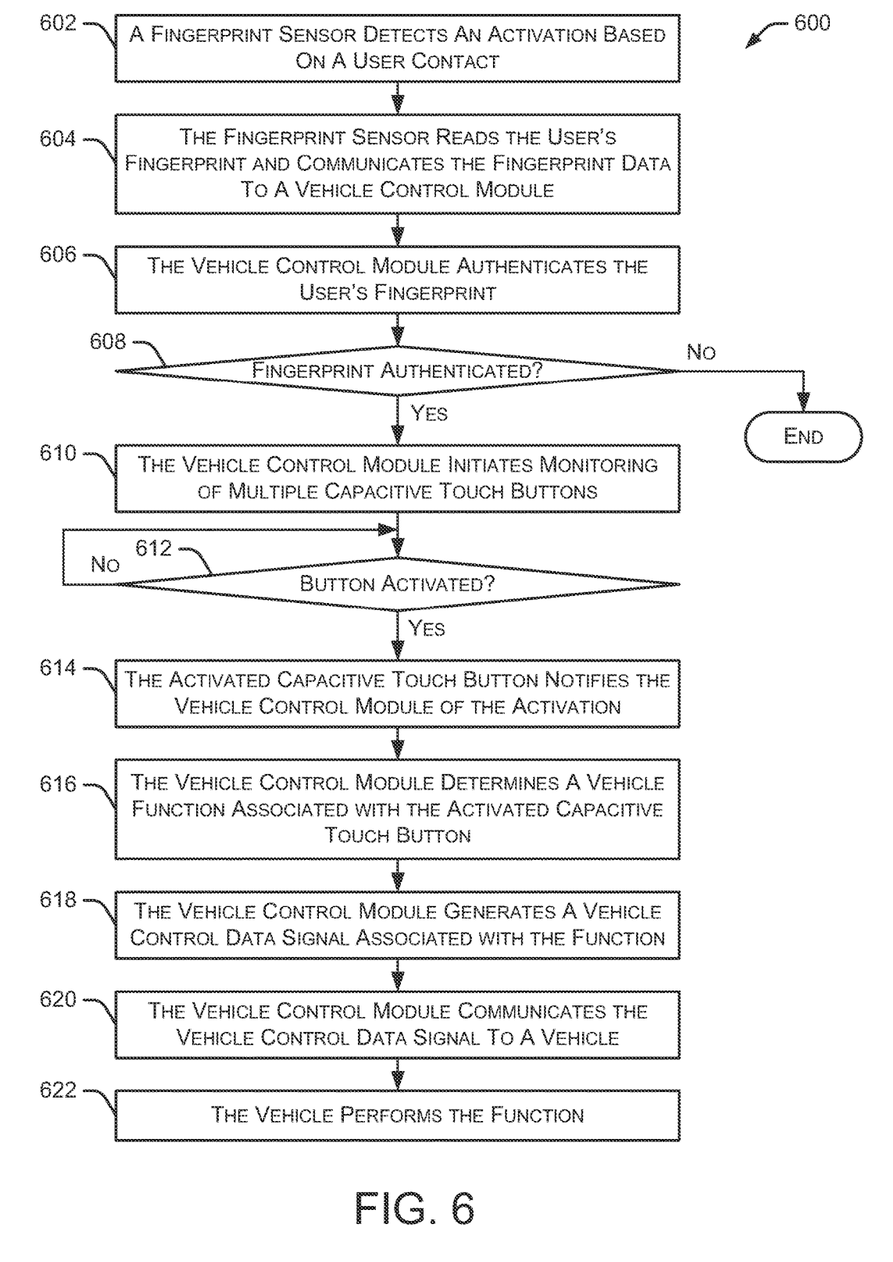
FIG. 6 is a flow diagram depicting another embodiment of a method for performing vehicle functions using buttons on a mobile device case that includes a fingerprint sensor.

FIG. 6 is a flow diagram depicting another embodiment of a method 600 for performing vehicle functions using buttons on a mobile device case that includes a fingerprint sensor. Initially, a fingerprint sensor detects an activation based on a user contact at 602. The fingerprint sensor reads the user's fingerprint and communicates the fingerprint data to a vehicle control module at 604. The vehicle control module authenticates the user's fingerprint at 606. If the fingerprint is not authenticated at 608, method 600 ends without initiating monitoring of any buttons on the mobile device case.

If the fingerprint is authenticated at 608, the vehicle control module initiates monitoring of multiple capacitive touch buttons at 610. Method 600 continues by determining whether any of the capacitive touch buttons are activated at 612. When one of the capacitive touch buttons is activated, that button notifies the vehicle control module of the activation at 614. The vehicle control module then determines a vehicle function associated with the activated capacitive touch button at 616. The method continues as the vehicle control module generates a vehicle control data signal associated with the function at 618. The vehicle control module communicates the vehicle control data signal to a vehicle at 620, which causes the vehicle to perform the function at 622.

Figure 7:
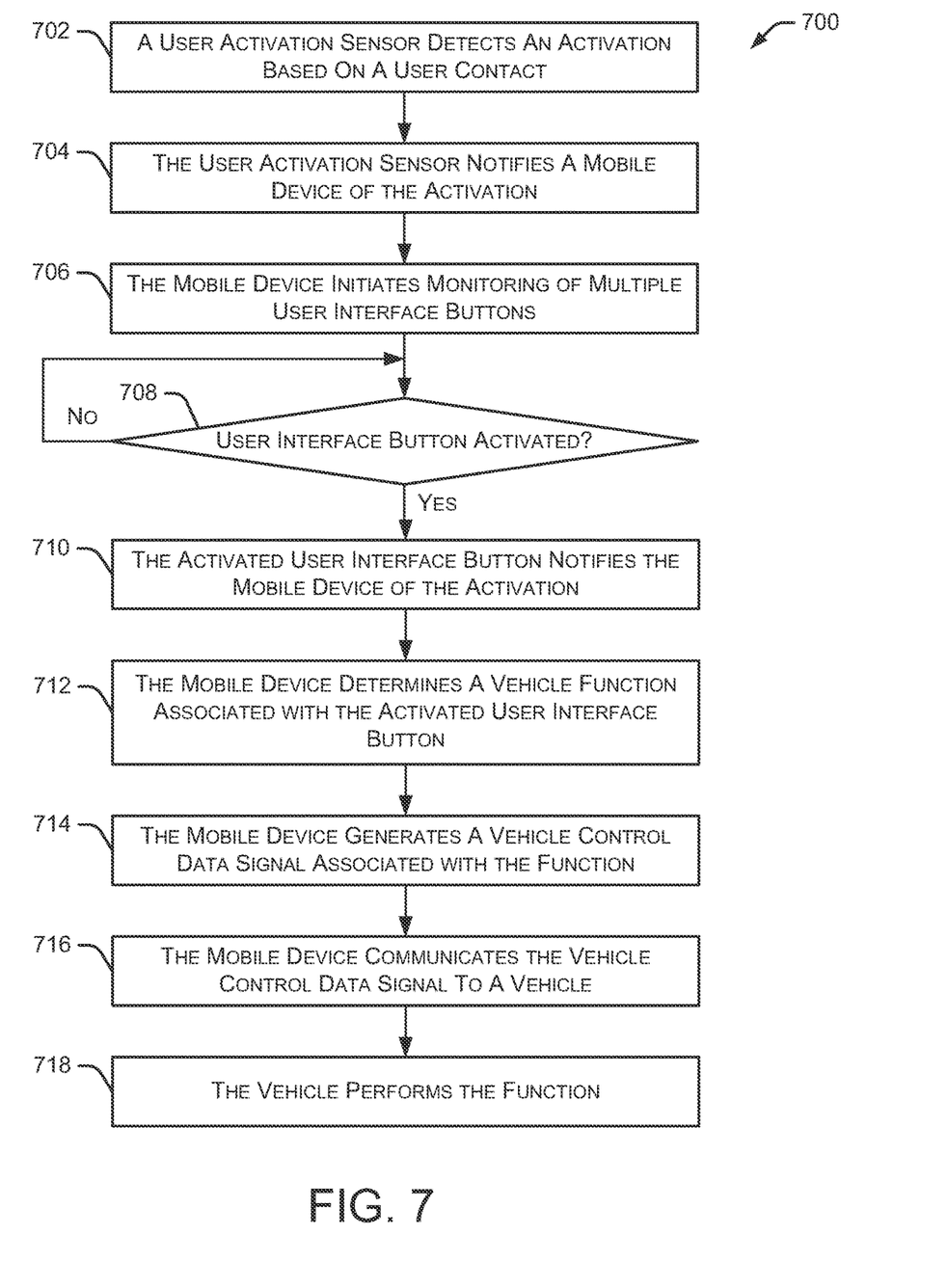
FIG. 7 is a flow diagram depicting another embodiment of a method for performing vehicle functions using buttons on a mobile device case.

FIG. 7 is a flow diagram depicting another embodiment of a method 700 for performing vehicle functions using buttons on a mobile device case. As described below, a mobile device inserted into the mobile device case performs certain operations. Initially, a user activation sensor detects an activation based on a user contact at 702. The user activation sensor notifies a mobile device of the activation at 704. For example, the mobile device may be inserted into the mobile device case. The mobile device initiates monitoring of multiple user interface buttons at 706. If a user interface button is activated at 708, the activated button notifies the mobile device of the activation at 710.

Method 700 continues as the mobile device determines a vehicle function associated with the activated user interface button at 712. The mobile device then generates a vehicle control data signal associated with the function at 714. Finally, the mobile device communicates the vehicle control data signal to a vehicle at 716, which causes the vehicle to perform the function at 718.

In some embodiments, the mobile device receives user interface button activation information from the mobile device case via vehicle control module 302. In other embodiments, the mobile device communicates directly with the user interface buttons, thereby eliminating the need for vehicle control module 302.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. An apparatus comprising:
a mobile computing device having a front side and a back side;
a housing protecting the mobile computing device and having a back portion overlaying at least a portion of the back side;
a capacitive touch button located on the back portion of the housing and associated with a vehicle function;
a user activation sensor configured to initiate monitoring of the capacitive touch button responsive to a user contact, wherein the user activation sensor is one of a fingerprint sensor configured to read a user's fingerprint or a swipe sensor configured to detect a swipe of the user's finger; and
a vehicle control module configured to sense activation of the capacitive touch button during the monitoring and respond thereto by sending a signal to a vehicle instructing the vehicle to perform the vehicle function.

2. The apparatus of claim 1, wherein the vehicle function includes at least one of lock vehicle doors, unlock vehicle doors, open trunk, activate vehicle alarm, deactivate vehicle alarm, initiate panic alert, and start vehicle engine.

3. The apparatus of claim 1, wherein the vehicle control module generates the signal and sends the signal to the vehicle.

4. The apparatus of claim 1, wherein the vehicle control module includes a vehicle control data generator configured to generate the signal.

5. The apparatus of claim 4, wherein the signal includes a unique code associated with the vehicle.

6. The apparatus of claim 1, wherein the vehicle control module includes a mobile device manager configured to manage communication with the mobile computing device.

7. The apparatus of claim 1, wherein the vehicle control module includes a communication module configured to communicate with the mobile computing device and communicate with the vehicle.

8. An apparatus comprising:
a mobile computing device having a front side and a back side;
a housing protecting the mobile computing device and having a back portion overlaying at least a portion of the back side;
a capacitive touch button located on the back portion of the housing and associated with a vehicle function, wherein the capacitive touch button is hidden from view prior to initiating monitoring of the capacitive touch button;
a user activation sensor configured to initiate monitoring of the capacitive touch button responsive to a user contact; and
a vehicle control module configured to sense activation of the capacitive touch button during the monitoring and respond thereto by sending a signal to a vehicle instructing the vehicle to perform the vehicle function.

9. The apparatus of claim 8, wherein the capacitive touch button is displayed on a capacitive touch screen.

10. A method comprising:
obtaining a system comprising (1) a mobile computing device having a front side and a back side and (2) a protective housing having a back portion overlaying at least a portion of the back side;
detecting activation of a user activation sensor based on a user contact with the user activation sensor, wherein the user activation sensor forms part of one of the mobile computing device and the protective housing, and wherein detecting activation of the user activation sensor includes one of detecting activation of a swipe sensor by the user or detecting activation of a fingerprint sensor capable of reading the user's fingerprint;
initiating monitoring of a plurality of user interface buttons responsive to detecting activation of the user activation sensor, wherein the plurality of user interface buttons are located on the back portion of the protective housing;
detecting, by one or more processors during the monitoring, when one of the plurality of user interface buttons is activated; and
responding to detecting activation of the one of the plurality of user interface buttons by (1) generating a vehicle control data signal associated with a vehicle function assigned to the one of the plurality of user interface buttons, and (2) sending the vehicle control data signal to a vehicle.

11. The method of claim 10, further comprising authenticating the user's fingerprint.

12. The method of claim 11, wherein initiating monitoring of a plurality of user interface buttons is performed after successful authentication of the user's fingerprint.

13. The method of claim 10, wherein the one or more processors form part of the protective housing and are separate and distinct from all processors forming part of the mobile computing device.

14. The method of claim 10, wherein the user activation sensor forms part of the mobile computing device.

15. A protective case for a mobile computing device, the case comprising:
a housing having a back portion overlaying at least a portion of a back side of the mobile computing device;
a plurality of buttons located on the back portion of the housing and associated with a plurality of vehicle functions;
a user activation sensor configured to initiate monitoring of the plurality of buttons responsive to a user contact, wherein the plurality of buttons are hidden from view prior to initiating monitoring of the plurality of buttons; and
a vehicle control module configured to sense activation of a particular button of the plurality of buttons during the monitoring and respond thereto by (1) generating a signal instructing a particular vehicle to perform a particular function of the plurality of vehicle functions associated with the particular button and (2) send the signal to the particular vehicle.

16. The protective case of claim 15, wherein the signal includes a unique code associated with the particular vehicle.

* * * * *